United States Patent
Ito et al.

(10) Patent No.: US 6,409,546 B1
(45) Date of Patent: Jun. 25, 2002

(54) CARD CONNECTOR (75) Inventors: Toshiyasu Ito, Togane; Noriaki Furuta, Otsu, both of (JP)

(73) Assignees: Yamaichi Electronics Co., Ltd., Tokyo; Matsushita Electric Industrial CO, Ltd., Osaka, both of (JP)

( * ) Notice: Subject to any disclaimer, the term of this patent is extended or adjusted under 35 U.S.C. 154(b) by 0 days.

(21) Appl. No.: 09/706,786

(22) Filed: Nov. 7, 2000

(30) Foreign Application Priority Data

Nov. 9, 1999 (JP) ............................................. 11-318916

(51) Int. Cl.[7] .............................................. H01R 24/00
(52) U.S. Cl. ...................... 439/630; 439/660; 439/733.1
(58) Field of Search ................................ 439/630, 660, 439/733.1

(56) References Cited

U.S. PATENT DOCUMENTS 4,392,705 A * 7/1983 Andrews, Jr. et al. ...... 439/660
5,904,597 A * 5/1999 Doi et al. .................... 439/660

* cited by examiner

Primary Examiner—Tho D. Ta
(74) Attorney, Agent, or Firm—Finnegan, Henderson, Farabow, Garrett & Dunner, L.L.P.

(57) ABSTRACT

A card 20 is supported in the connector so that the partition walls 29 of the card 20 fit between the contact supports 31 each made up of paired raised portions 33a, 33b formed on the upper surface of the base plate 30 of the connector housing. This construction realizes a reduction in the height of the connector that receives a card which has contact pads arranged in recessed portions separated from one another by partition walls.

6 Claims, 9 Drawing Sheets

CARD CONNECTOR

This application is based on Japanese Patent Application No. 11-318916 (1999) filed Nov. 9, 1999, the content of which is incorporated hereinto by reference.

BACKGROUND OF THE INVENTION

1. Field of the Invention

The present invention relates to a card connector for electronic devices, such as cellular phones, telephones, PDAs (personal digital assistants), portable audio devices and digital cameras, and more specifically to a card connector with a reduced height which receives a two-stage thickness IC card with stepped portions at its side edges.

2. Description of the Related Art

In electronic devices such as cellular phones, telephones, PDAs and digital cameras, a variety of functions are added by inserting an IC card with a built-in memory or a control IC, such as a SIM (subscriber identity module) card and an MMC (multimedia card).

In a connector structure for removably accommodating such an IC card, a plurality of contact terminals made of a metal leaf spring are provided in a connector housing to contact a plurality of contact pads formed on the front or back surface of the inserted IC card to bring the IC card into electrical contact with the electronic device having that connector. The contact pads of the IC card include a power supply pad connected to a power supply line and a plurality of signal pads for transferring various signals. These contact pads are connected via the contact terminals of the card connector to a power supply circuit and various signal processing circuits in the electronic device.

Figure 9:
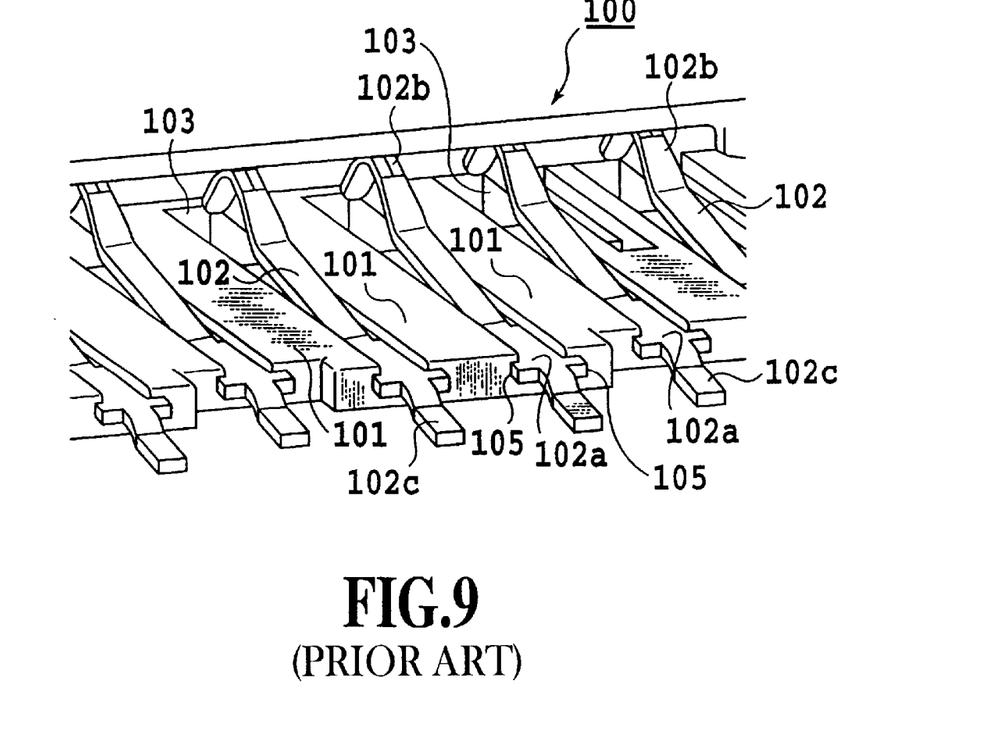
FIG. 9 is a perspective view showing a conventional card connector.

FIG. 9 shows a general construction of the contact terminals and their associated components in the connector into which the IC card of this kind is to be loaded.

In FIG. 9, a base plate 101 of the connector housing 100 is formed with a plurality of support grooves 103 to support contact terminals 102. The contact terminals 102 are secured to the base plate 101 by fitting under pressure the side edges of fixed portions 102a thereof into press-fit grooves 105 formed in the side walls of the support grooves 103. Spring contact portions 102b of the contact terminals 102 are elastically deformed by the inserted card and brought into pressing contact with the contact pads of the card with a predetermined contact pressure. Terminal portions 102c of the contact terminals 102 are connected to a printed circuit board by solder.

In a connector which accommodates a card having contact pads on its underside, the contact terminals 102 are arranged below or above the card so that they can be elastically displaced and brought into contact with the contact pads. When the mounting area of the connector is to be reduced, the contact terminals 102 are arranged in the connector housing in such a way that the terminal portions 102c of the contact terminals 102 that are to be soldered will not protrude out of the connector housing but stay below the card.

It is therefore considered most effective in reducing the mounting area of the connector to form the support grooves 103 for securely holding the contact terminals 102 in the base plate 101 of the connector housing and provide the support grooves 103 with some means for securing the contact terminals 102, as shown in FIG. 9.

Figure 10:
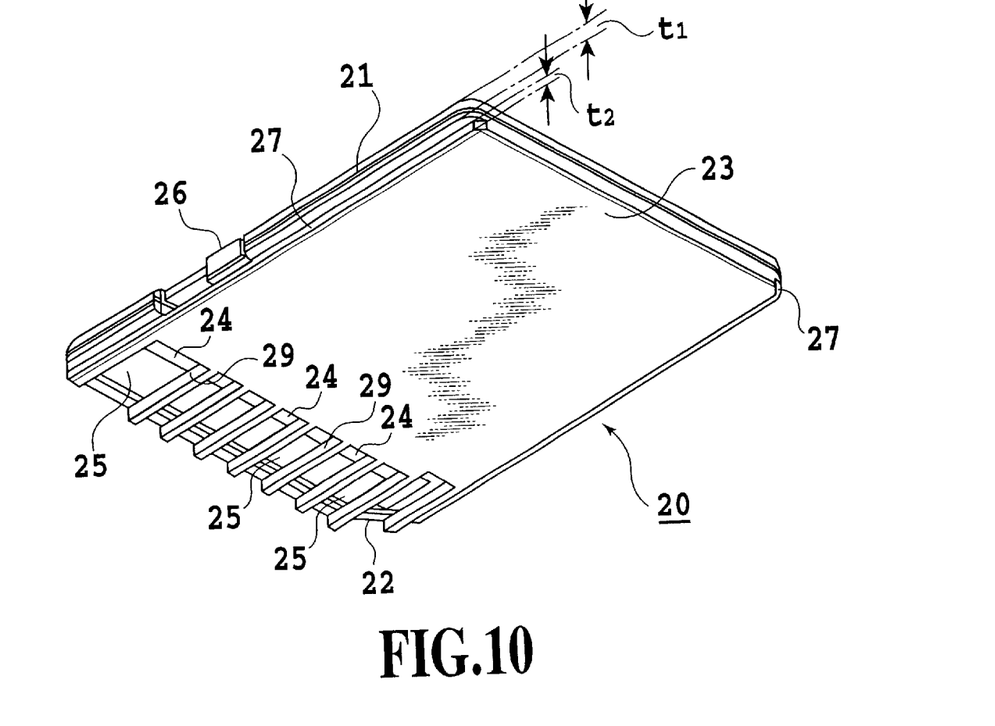
FIG. 10 is a perspective view showing a two-stage thickness card applied to this invention.
Figure 11:
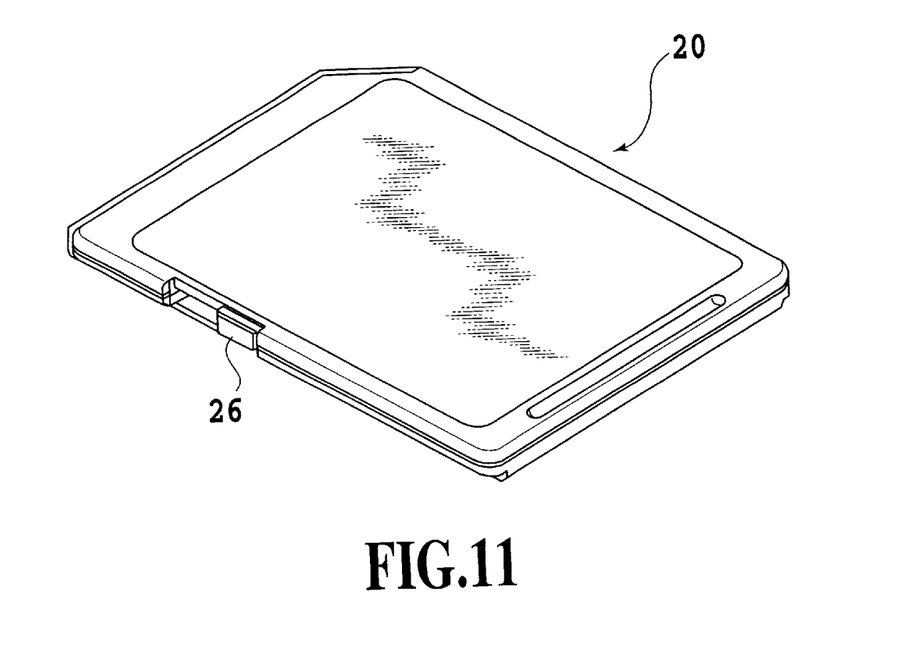
FIG. 11 is a perspective view showing a two-stage thickness card applied to this invention.

An IC card 20 as shown in FIG. 10 and FIG. 11 has been proposed in recent years. FIG. 10 shows the surface of the card where the contacts are arranged and FIG. 11 shows the opposite surface.

This card 20 is called an SD (super density or secure digital) card and has an upper body portion 21 with a thickness of t1. It has an almost triangular notched portion 22 on the right front end portion for preventing erroneous insertion of the card. On the back side of the upper body portion 21 is formed a lower body portion 23 with a thickness of t2 and a width slightly narrower than the upper body portion 21. The card 20 therefore has a stepped portion 27 formed at both side edges by the underside of the upper body portion 21 and the underside of the lower body portion 23.

On the front end side of the lower body portion 23 there are formed a plurality of recessed portions 24 separated from one another by a plurality of partition walls 29. Contact pads 25 are placed in these recessed portions 24. The depth of each recessed portion 24 is almost equal to the height of the lower body portion 23. Hence, the surface of each contact pad 25 is situated away from the front surface of the upper body portion 21 by the thickness t1 of the upper body portion 21. A write protect switch 26 is provided at the side surface of the card 20.

Figure 12:
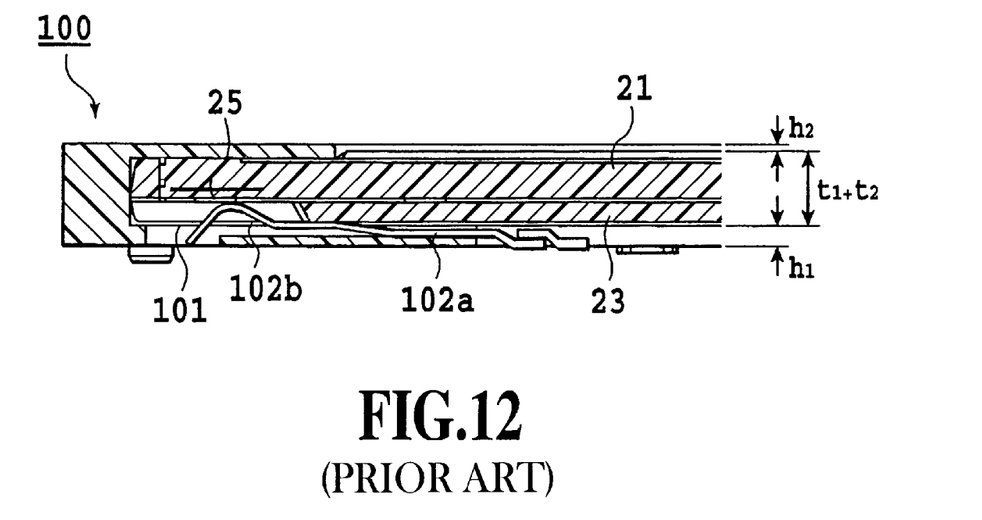
FIG. 12 is a cross section of a conventional card connector of FIG. 9 in which the two-stage thickness card is inserted.

FIG. 12 shows the card 20 inserted into the connector of FIG. 9.

As shown in FIG. 12, in the connector structure of FIG. 9, the card 20 must be held so that the undersides of the partition walls 29 of the card 20 abut against the upper surface of the housing base plate 101.

Thus, in the connector structure of FIG. 9, the connector requires a height at least equal to the sum of the thickness h1 of the housing base plate 101 formed with the support grooves 103, the thickness t1+t2 of the card 20 (distance from the upper surface of the upper body portion 21 to the underside of the lower body portion 23) and the thickness h2 of the housing top plate. As a result, the height of the connector housing becomes large.

Under these circumstances, the present invention has been accomplished to provide a card connector which can reduce the height of a connector structure that receives a card having contact pads arranged in recessed portions separated from one another by partition walls.

SUMMARY OF THE INVENTION

In the present invention, a card connector for holding a card in a connector housing, wherein the card has an upper body portion, a lower body portion slightly narrower in width than the upper body portion and formed with a row of a plurality of recessed portions separated from one another by a plurality of partition walls, a plurality of contact pads placed in the recessed portions, and stepped portions formed at its both side edges by an underside of the upper body portion and an underside of the lower body portion, the card connector comprising: a plurality of contact terminals arranged in the connector housing and elastically deformed by the inserted card to contact the contact pads; and a plurality of contact supports each made up of a pair of raised portions with a support groove to support the associated contact terminal formed between the raised portions; wherein an overall width of each of said contact supports is smaller than an interval between said partition walls of the card, and said contact supports are formed projecting from the connector housing at a predetermined pitch corresponding to the interval between said partition walls so that said partition walls of said card fit between said contact supports when the card is inserted into the card connector.

According to the invention, since the connector of this invention supports the card in such a manner that the partition walls of the card fit between the plurality of contact supports each made up of a pair of raised portions, the thickness of the connector can be reduced by an amount virtually equal to the height of the raised portions fitted between the partition walls. The height of the connector can therefore be reduced.

As described above, because the connector of this invention supports the card in such a manner that the partition walls of the card fit between the plurality of contact supports each made up of a pair of raised portions, the thickness of the connector can be reduced by an amount virtually equal to the height of the raised portions fitted between the partition walls. The height of the connector can therefore be reduced.

The above and other objects, effects, features, and advantages of the present invention will become more apparent from the following description of embodiments thereof taken in conjunction with the accompanying drawings.

DETAILED DESCRIPTION OF PREFERRED EMBODIMENTS

Now the embodiment of this invention will be described in detail referring to the accompanying drawings.

Figure 1:
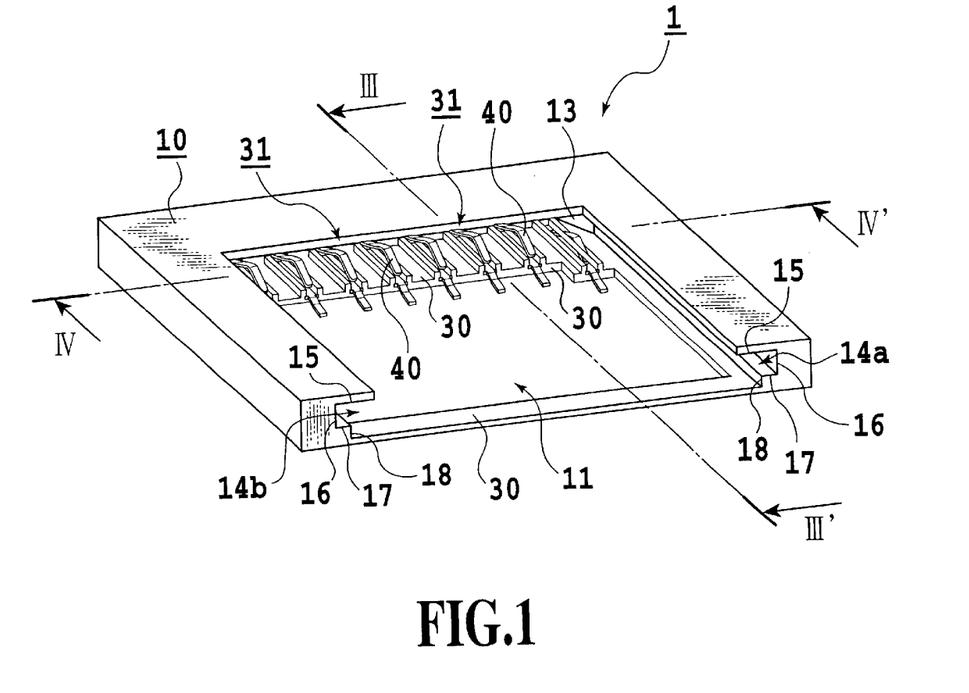
FIG. 1 is a perspective view showing an outline construction of a card connector according to one embodiment of this invention.
Figure 2:
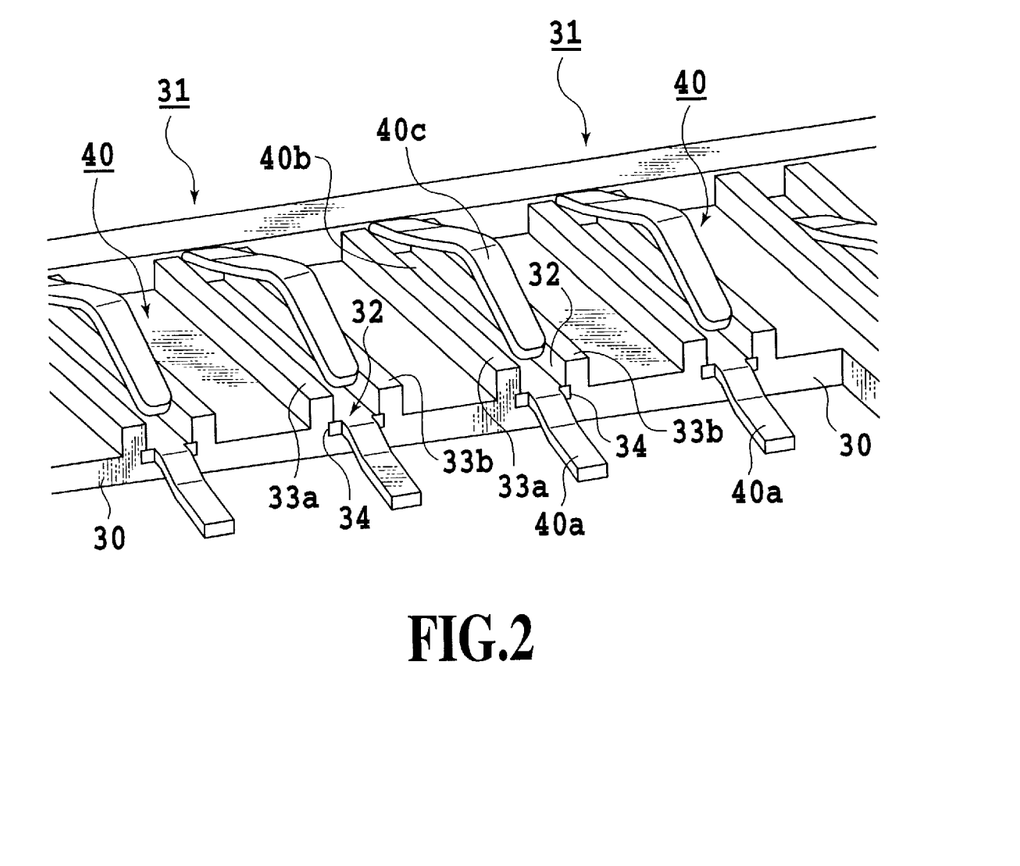
FIG. 2 is an enlarged perspective view showing an essential part of the card connector according to the embodiment of the invention.
Figure 3:
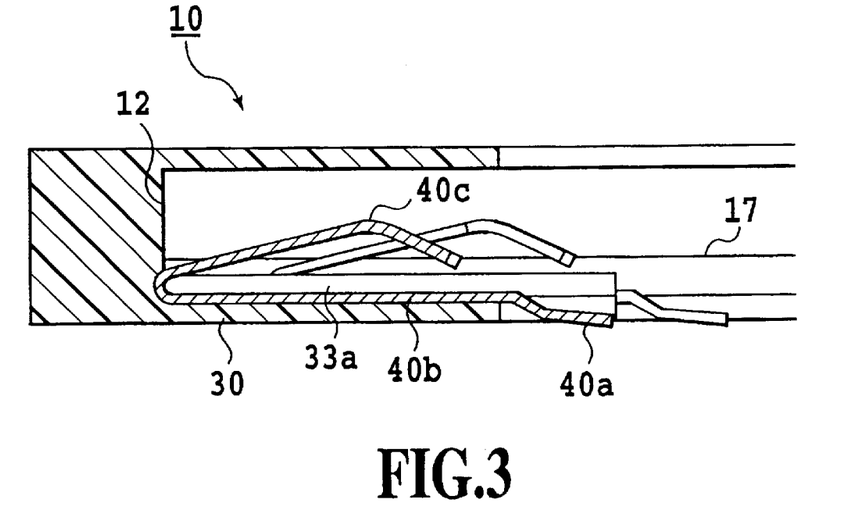
FIG. 3 is a cross section taken along the line III–III' of FIG. 1 when a card is not inserted.
Figure 4:
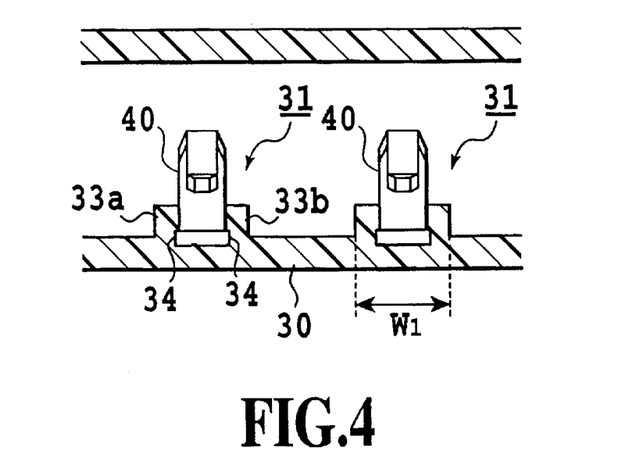
FIG. 4 is a cross section taken along the line IV–IV' of FIG. 1 when card is not inserted.
Figure 5:
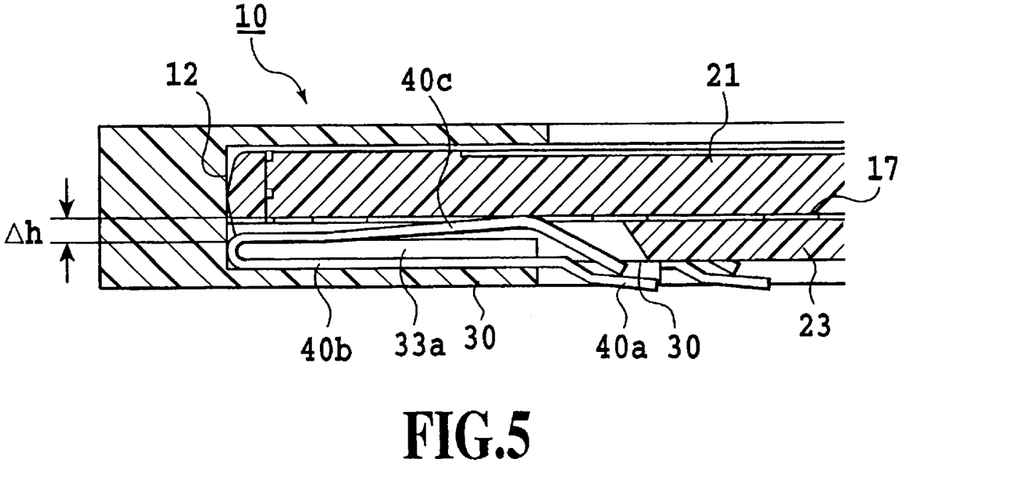
FIG. 5 is a cross section taken along the line III–III'of FIG. 1 when the card is inserted.
Figure 6:
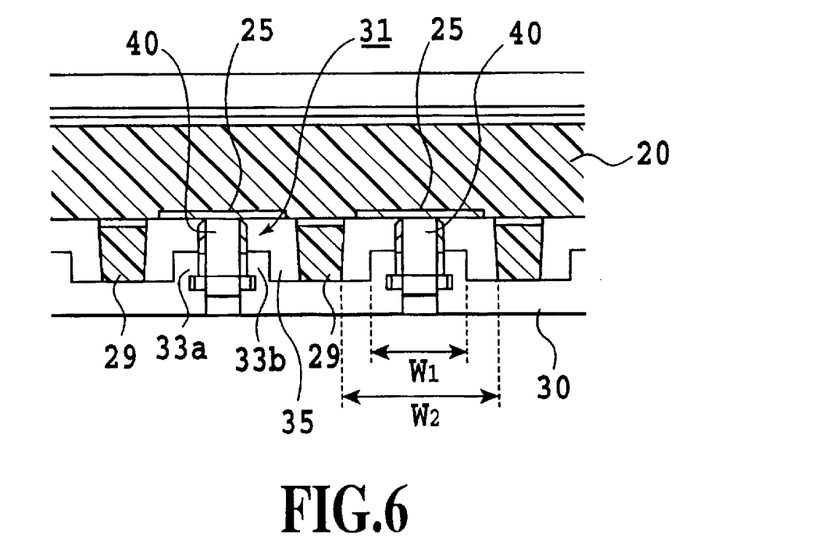
FIG. 6 is a cross section taken along the line IV–IV' of FIG. 1 when the card is inserted.
Figure 7:
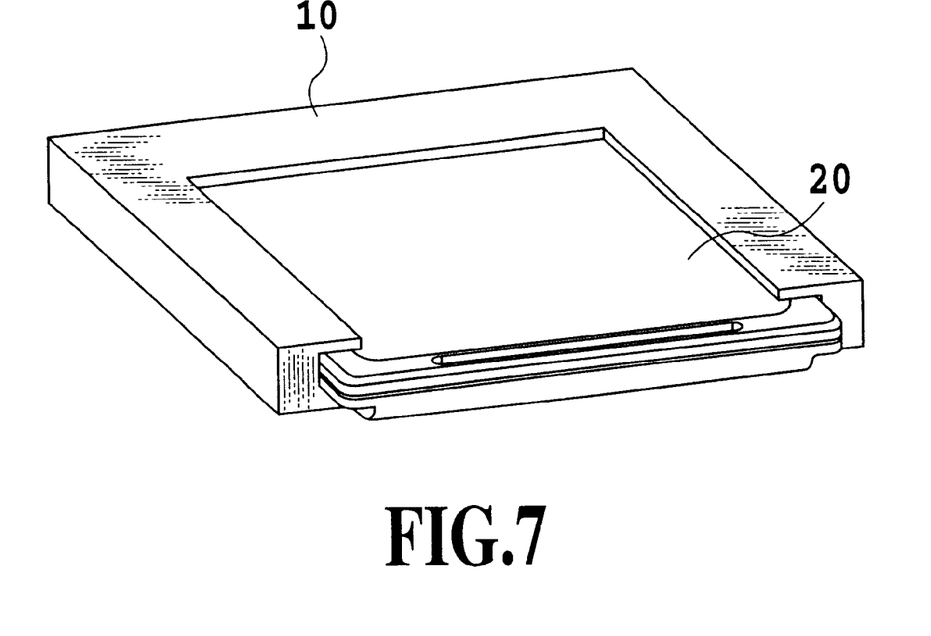
FIG. 7 is a perspective view showing an outline construction of the card connector according to the embodiment of the invention when the card is inserted.

FIG. 1 is a perspective view showing the card connector as one embodiment of this invention. FIG. 2 is a perspective view showing the construction of contact terminals and their associated components. FIG. 3 is a cross section taken along the line III–III' of FIG. 1. FIG. 4 is a cross section taken along the line IV–IV' of FIG. 1. FIG. 5 is a cross section taken long the line III–III') of FIG. 1 with the card 20 inserted. FIG. 6 is a cross section taken along the line IV–IV' of FIG. 1 with the card 20 inserted. FIG. 7 is a perspective view showing the card connector with the card 20 inserted.

The card connector 1 is mounted on electronic devices, such as cellular phones, PDAS, portable audio devices and cameras.

The connector 1 shown in FIGS. 1 to 7 is basically designed to receive a two-stage thickness card 20 with a stepped portion, such as an SD card, as shown in FIG. 10 and FIG. 11.

In FIGS. 1 to 7, the card connector 1 has a connector housing 10 integrally molded of an insulating material such as resin.

The IC card 20 is inserted into the connector 1 through a card insertion opening 11 formed at the front face of the connector housing 10.

The connector housing 10 has an abutment wall 12 against which the inserted IC card 20 is pressed. The abutment wall 12 has a corner wall 13 at one corner against which a notched portion 22 of the IC card 20 abuts.

The IC card 20 is guided in the insertion/retraction direction with its side edge portions being supported by a pair of guide grooves 14a, 14b formed in the side walls of the housing 10.

One of the guide grooves 14a extends from the card insertion opening 11 to the corner wall 13 and the other guide groove 14b extends from the card insertion opening 11 to the abutment wall 12.

Each of the guide grooves 14a, 14b is defined by a top wall 15, a side wall 16 and a bottom wall 17. A side wall 18 is formed extending downwardly from the edge of the bottom wall 17 of each of the guide grooves 14a, 14b. A base plate 30 forming the bottom wall of the housing 10 is formed with a plurality of contact supports 31 for positioning and securing a plurality of contact terminals 40.

The contact terminals 40 include a power supply terminal and signal terminals. Each of the contact terminals 40 has a terminal portion 40a soldered to the contact pad on a printed circuit board of an electronic device, a fixed portion 40b press-fitted into the contact support 31, and a contact spring portion 40c elastically deflected into contact with the contact pad 25 of the card 20.

Each of the contact supports 31 has a pair of raised portions 33a, 33b with a support groove 32 supporting the fixed portion 40b of the contact terminal 40 being formed between the raised portions. At the bottom of the support groove 32, i.e., at the lower end of inner walls of the raised portions 33a, 33b, press-fit grooves 34 are formed into which the both side edges of the fixed portion 40b of the contact terminal 40 are fitted under pressure. The fixed portion 40b of the contact terminal 40 is securely supported by the press-fit grooves 34.

An overall width W1 of each contact support 31 made up of the paired raised portions 33a, 33b is set smaller than an interval W2 between the partition walls 29 of the card 20, as shown in FIG. 6. The lateral positions of the contact supports 31 and their arrangement pitch are so set that when the card 20 is inserted into the connector 1, the contact supports 31 deviate in lateral position from the partition walls 29 of the card 20, i.e., the contact supports 31 are situated directly below the contact pads 25 of the card 20.

With this connector structure therefore, when the card 20 is inserted into the connector 1, the raised portions 33a, 33b fit into the recessed portions 24 between the partition walls 29 allowing the contact portion of the contact spring portion 40c of the contact terminal 40 supported by the raised portions 33a, 33b to contact the contact pad 25. In other words, each of the partition walls 29 of the card 20 fits into recessed portion 35 between the contact supports 31 made up of the raised portions 33a, 33b, with the underside of each of the partition walls 29 being kept almost in contact with the upper surface of the base plate 30.

In this connector construction, when the two-stage thickness card 20 is inserted into the connector 1, the both side edges of the upper body portion 21 of the card 20 are guided by the side walls 16 of the guide grooves 14a, 14b. At the same time, the both side edges of the underside of the upper body portion 21, i.e., the stepped portions 27, are supported by the bottom walls 17. Further, the both side portions of the upper surface of the upper body portion 21 are restricted by the top walls 15 to keep the card 20 from getting floated by the elastic force of the contact terminals 40.

Further, the lower body portion 23 of the two-stage thickness card 20 is accommodated in a space enclosed by the side walls 18 and the base plate 30.

Therefore, as shown in FIG. 5, the bottom walls 17 of the guide grooves 14a, 14b are formed at a position which is a predetermined height Δh above the upper surfaces of the paired raised portions 33a, 33b, the predetermined height Δh being equal to a distance that the contact terminal 40 when elastically deformed protrudes from the upper surfaces of the raised portions 33a, 33b. With this construction, when the card is inserted with the stepped portions 27 supported by the bottom walls 17 of the guide grooves 14a, 14b of the connector 1, the contact spring portion 40c of the contact terminal 40 supported by he contact support 31 made up of the raised portions 33a, 33b can be elastically deformed up to the state shown in FIG. 5 and brought into contact with the contact pad 25 of the card 20 with an appropriate contact pressure.

At this time, the partition walls 29 of the card 20 fit into the recessed portions 35 between the contact supports 31 made up of the raised portions 33a, 33b, bringing the underside of the partition walls 29 almost into contact with the upper surface of the base plate 30.

Figure 8A:
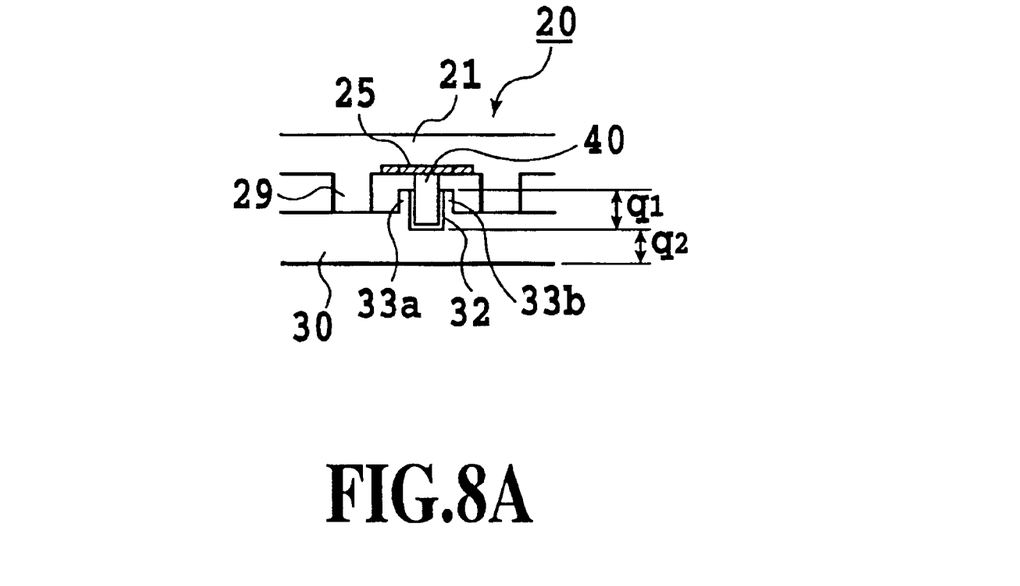
FIGS. 8A and 8B are outline cross sections showing comparison between the present invention and a prior art.
Figure 8B:
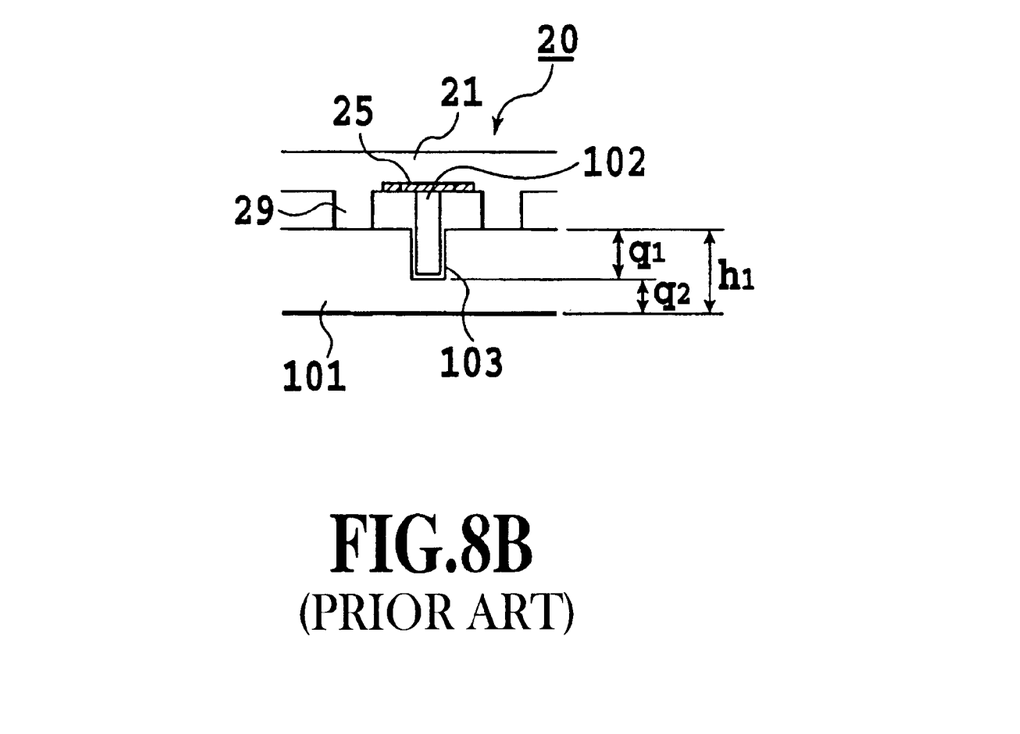

FIG. 8A shows a simplified construction of the connector according to this invention, and FIG. 8B shows a simplified construction of a conventional connector of FIG. 9.

It is assumed that the support grooves 32 formed in the base plate 30 of the connector of this invention and the support grooves 103 of the conventional connector have equal depths q1 and portions of the base plate directly below the support grooves 32 of the connector of this invention and portions of the base plate directly below the support grooves 103 of the conventional connector have the same thickness q2.

As can be seen from the comparison between these figures, because in the connector structure of this invention the contact terminals 40 are fixed by the support grooves 32 formed between the paired raised portions 33a, 33b projecting from the base plate 30, the overall height of the connector can be reduced by an amount equal to the height of the raised portions 33a, 33b, compared with the conventional technology in which the contact terminals 102 are secured by the support grooves 103 formed in the flat base plate 101.

In the connector structure of this invention, although the distance that the contact terminal 40 when elastically deformed projects from the support groove 32 (upper surfaces of the raised portions 33a, 33b) is smaller than in the conventional structure, the same contact pressure as in the conventional structure can be obtained by changing the elasticity (such as spring constant) as by changing the contact shape.

In this embodiment therefore, because the card 20 is supported such that the partition wall 29 of the card 20 fits between the contact supports 31 each made up of the paired raised portions 33a, 33b, the thickness of the connector 1 can be reduced by an amount essentially equal to the height of the raised portions 33a, 33b accommodated between the partition walls 29, thus reducing the height of the connector as a whole.

In the above connector structure, the positioning in the lateral direction of the two-stage thickness card 20 with respect to the connector 1 may be performed based on either the side walls 16 forming the guide grooves 14a, 14b or the side walls 18 provided below the side walls 16.

The contact terminal 40 is not limited in shape to this embodiment but may employ any other desired shape.

Further, although in the above embodiment the top wall of the connector housing 10 covers only the guide grooves 14a, 14b, abutment wall 12 and their surrounding area, the top wall may cover the entire or almost all surface of the card, or a part of the card such as only contact pads. This also applies to the bottom wall of the connector housing.

Further, the connector housing may be formed of a plurality of housing members, such as an upper housing made of a worked metal and a lower housing made of resin.

Further, although in the above embodiment an SD card is used as an example of the two-stage thickness card 20, this invention may be applied to other cards of the similar shape.

Further, in the above embodiment, because the card 20 is inserted with the side attached with the contacts facing down, the contact terminals 40 are arranged on the base plate 30 of the connector housing 10. In a connector in which the card 20 is inserted with the side attached with the contacts facing up, the contact terminals 40 may be arranged on the top plate side of the connector housing 10. In such a connector, a plurality of the contact supports 31 each formed of the paired raised portions 33a, 33b need to be provided on the top plate side of the connector housing 10.

Furthermore, while in the above embodiment the contact terminals 40 are of a folded type, it is possible to use contact terminals that extend in one direction only or contact terminals of other shapes.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector for holding a card, the card having an upper body portion, a lower body portion slightly narrower in width than the upper body portion and formed with a row of a plurality of recessed portions separated by a plurality of partition walls, a plurality of contact pads placed in the recessed portions, and stepped portions formed at both side edges of the card by an underside of the upper body portion and an underside of the lower body portion, the card connector comprising:

a connector housing;

a plurality of contact terminals arranged in the connector housing and elastically deformable to contact the contact pads when the card is inserted into the card connector; and a plurality of contact supports each made up of a pair of raised portions with a support groove to support the associated contact terminal formed between the raised portions;

wherein an overall width of each of said contact supports is smaller than an interval between said partition walls of the card, and said contact supports are formed projecting from the connector housing at a predetermined pitch corresponding to the interval between said partition walls so that said partition walls of said card fit between said contact supports when the card is inserted into the card connector.

2. A card connector according to claim 1, wherein said plurality of contact supports are formed on a top plate of the connector housing.

3. A card connector according to claim 1, wherein the connector housing comprises:

a pair of guide grooves formed in both side walls of the connector housing to support and guide both side edges of the upper body portion of the card as the card is inserted or retracted; and side walls for defining a second space, formed below a first space defined by said pair of guide grooves, for accommodating the lower body portion of the card;

wherein bottom walls of said guide grooves are formed at a position a predetermined height above upper surfaces of said raised portions, the predetermined height being equal to a distance that said contact terminals when elastically deformed project from the upper surfaces of said raised portions.

4. A card connector according to claim 1, wherein each of the contact terminals includes:

a fixed portion secured in the support groove between the pair of raised portions;

a contact spring portion extending from one end of the fixed portion and elastically displaced to engage the associated contact pad of the card; and a terminal portion extending from the other end of the flyed portion.

5. A card connector according to claim 1, wherein said plurality of contact supports are formed on a base plate of the connector housing.

6. A card connector according to claim 5, wherein the connector housing comprises:

a pair of guide grooves formed in both side walls of the connector housing to support and guide both side edges of the upper body portion of the card as the card is inserted or retracted; and side walls for defining a second space, formed below a first space defined by said pair of guide grooves, for accommodating the lower body portion of the card;

wherein bottom walls of said guide grooves are formed at a position a predetermined height above upper surfaces of said raised portions, the predetermined height being equal to a distance that said contact terminals when elastically deformed project from the upper surfaces of said raised portions.

\* \* \* \* \*